Nov. 19, 1940.   R. C. SANDERS, JR   2,222,587
RADIO ALTIMETER
Filed June 16, 1939   2 Sheets-Sheet 1

Inventor
Royden C. Sanders, Jr.
By
Attorney

Nov. 19, 1940.  R. C. SANDERS, JR  2,222,587
RADIO ALTIMETER
Filed June 16, 1939  2 Sheets-Sheet 2
Fig. 3.
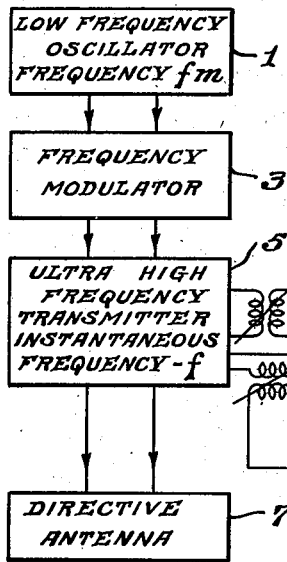
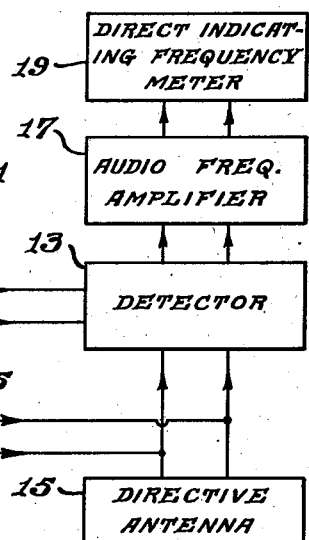
Fig. 4.  Fig. 5.
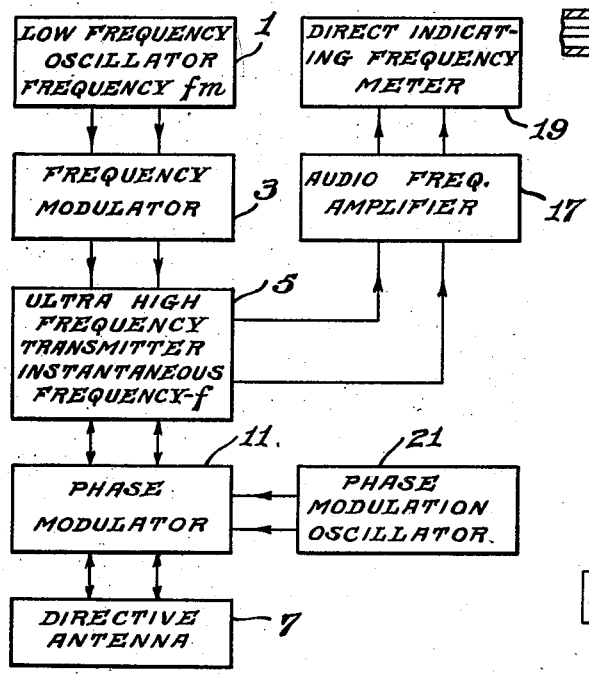
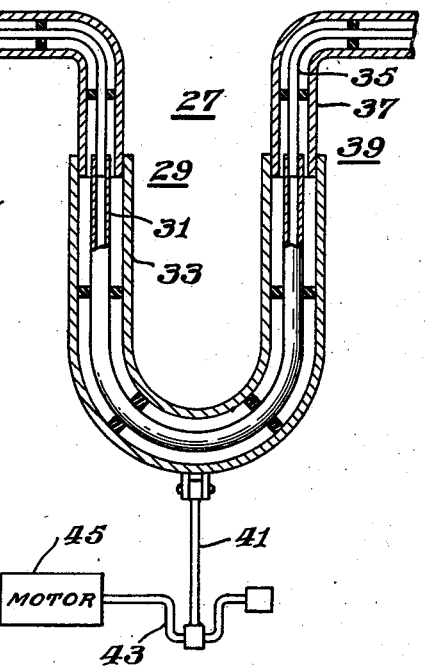
Inventor
Royden C. Sanders, Jr
By
Attorney Patented Nov. 19, 1940

2,222,587

UNITED STATES PATENT OFFICE 2,222,587

RADIO ALTIMETER

Royden C. Sanders, Jr., Audubon, N. J., assignor to Radio Corporation of America, a corporation of Delaware Application June 16, 1939, Serial No. 279,579

14 Claims. (Cl. 250—1)

This invention relates to altimeters or distance indicators of the type in which frequency modulated radio waves are transmitted from a point in space toward a wave reflecting object and back to the point to indicate the altitude or distance as a function of frequency. More particularly, the invention is an altimeter of the frequency modulated type in which phase modulation is also used to increase the accuracy of indication.

Frequency modulated types of altimeters are known to those skilled in the art. One such device is described in the Bentley Patent No. 2,011,392; another is disclosed in the Espenschied Patent No. 2,045,071. In practice, a direct reading frequency meter of the electron-counter type is used to indicate altitude as a function of frequency. The standing wave pattern varies with the frequency modulation and this variation produces an audio signal of a certain frequency which is indicated by the direct reading meter. The use of a constant band width frequency modulated wave with a direct reading frequency meter leads to erroneous indications of altitude.

The nature of these errors is described in considerable detail in a copending application Serial No. 253,280, filed January 28, 1939, for Radio altimeters. That application discloses a variable band width system which minimizes the errors. The present application discloses a radio altimeter in which "phase-frequency modulation" is used to minimize the errors of an altimeter of the type described. The term "phase-frequency modulation" is used to describe a carrier wave device which is modulated by both phase and frequency changes. The phase modulation may occur in the receiver or transmitter, or both, as hereinafter described.

Figure 1:
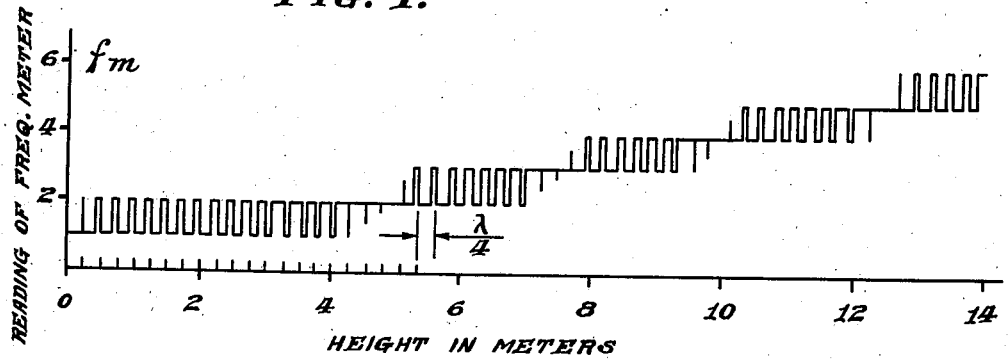
Figure 2:
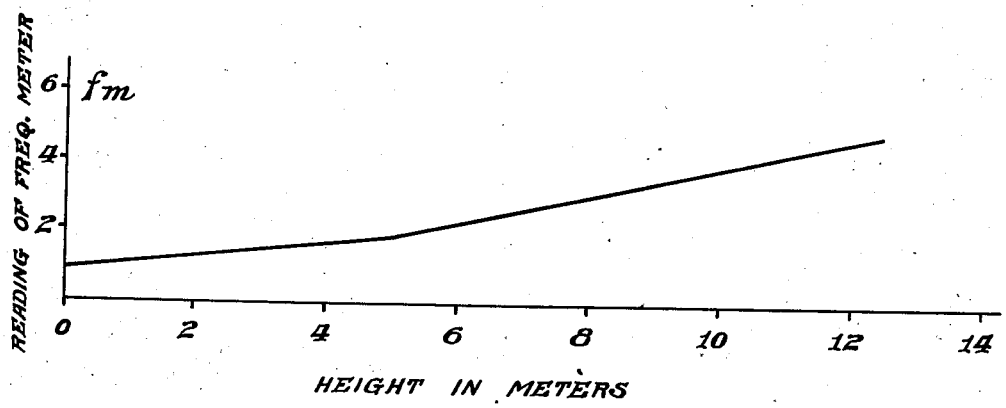

In order to explain the theory of operation of the altimeter, reference is made to Fig. 1 which is a graph illustrating the characteristics of a conventional constant band width frequency modulation altimeter. The abscissa indicates the actual height in meters and in quarter wave lengths. The reading of the frequency meter is indicated as a function of the modulation frequency fm. It may be seen that the reading is erroneous and does not correctly indicate altitude. For example, at 2 meters altitude, the reading will vary from one fm. to two fm. Furthermore, at four meters altitude, the reading will indicate one fm. or two fm. but with an increasing tendency to indicate two fm. It will be noted that the variation between one fm. and two fm. and back to one fm. always takes place within a quarter wave length. Since a quarter wave length change in height may be effectively obtained by shifting the phase between the direct and reflected waves at the detector through 180°, it follows that an accurate average reading may be obtained by continuously shifting this phase through 180°. By means of such phase modulation, the resultant readings will not vary between one fm. and two fm. but will be averaged and may be represented as a smooth curve, as shown in Fig. 2. Because the meter readings are average readings, it is preferable that the phase modulation frequency, the frequency modulation frequency fm., and their difference frequency be so chosen that these three frequencies will always be greater than the highest frequency to which the meter is designed to respond and thus avoiding any instantaneous spurious indications.

One of the objects of the invention is to provide improved means for indicating distance as a function of the frequency of the received signal produced by a frequency modulated radio wave. Another object is to provide means for indicating altitude or distance by means of a phase-frequency modulated wave. An additional object is to provide means for indicating altitude as a function of the frequency of the received signal by means of a phase-modulated receiver. A further object is to provide means for indicating altitude as a function of the frequency of the received signal of a phase-frequency modulated radio transmitter. A still further object is to provide means for reducing the frequency band required in a frequency modulation type altimeter.

The invention will be described by reference to the accompanying drawings in which Figures 1 and 2 are graphs used to illustrate the operation of the invention; Figure 3 is a schematic diagram representing one embodiment of the invention; Figure 4 is a schematic diagram of another embodiment; and Figure 5 is a sectional view of one form of phase modulator. Similar reference numerals will be used to indicate similar elements of the invention.

Referring to Fig. 3, a low frequency oscillator 1 is connected through a frequency modulator 3 to an ultra high frequency transmitter 5. The ultra high frequency transmitter is connected to a directive antenna 7, and, through a coupling device 9 and a phase modulator 11, to a detector 13. The detector input is coupled to a directive receiving antenna 15. The detector output is applied to an audio frequency amplifier 17, which is, in turn, connected to a direct reading frequency meter 19. The phase modulator 11 is connected to a phase modulation oscillator 21. If the direct pickup of the radiated waves is of an objectionable amount, this effect may be neutralized by applying an equal and opposite electromotive force. The neutralizing circuit may consist of an attenuator 23, including a phasing network 25, connected between the transmitter and the receiving antenna.

The operation is as follows: The transmitter 5 generates an ultra high frequency wave of frequency $f$. The low frequency oscillator 1 applies a modulation current of frequency $f_m$ to the frequency modulator 3. The carrier is thus frequency modulated at the frequency $f_m$. The instantaneous frequency $f$ is sinusoidally varied $k_0f_0$ cycles about the average frequency $f_0$. The instantaneous frequency of the radiated wave equals $f = f_0 + k_0f_0 \sin 2\pi f_m t$. The generated frequency modulated wave is directively radiated and is also applied through the phase modulator to the detector. First, assuming that the phase modulator is not operated by the phase modulation oscillator, the detector would then combine the directly applied wave and the reflected wave to thereby form a beat frequency wave. The frequency of the beat would indicate, subject to the aforementioned errors, the distance the wave travelled or the altitude in terms of frequency.

Now assuming that the phase modulator is driven by the phase modulation oscillator, it may be seen that the wave applied directly to the detector is varied continuously in phase by a desired amount, preferably 180°, at the frequency of the phase modulation oscillator. In effect, the local oscillations are applied to the detector at continuously varying phase with respect to the received signal. It might be said, for purposes of explanation, that the altimeter is effectively raised and lowered through one or more standing waves at the phase modulation frequency and thus a more accurate average reading is obtained, as has been described above.

The phase modulation may be accomplished by any of the means known to those skilled in the art. One suitable embodiment of the phase modulation oscillator 21 and phase modulator 11 is shown in Fig. 5. The transmission line connecting the transmitter 4 and detector 13 may be of the concentric line type with a "trombone" type of phase shifter. The trombone 27 may be arranged so that the movable portion 29 is composed of inner 31 and outer 33 conductors which telescopically engage the inner 35 and outer 37 conductors of the fixed portion 39 of the trombone. The movable portion 29 is connected through a connecting rod 41 to a crank shaft 43 which is driven by a motor 45. The changing length of the transmission line changes the phase which may be varied through 90°, 180° or any desired number of degrees.

Since the embodiment of Fig. 4 is not unlike that of Fig. 3, the description will be limited to the differences. In the embodiment first described, an entirely separate receiver is employed and the local oscillations, after phase modulation, are applied to the detector. In the embodiment of Fig. 4, the transmitter 5 is used as an oscillating detector for reception, and in this respect resembles the Espenschied patent cited above. The phase modulator 11 is included, in the instant arrangement, between the transmitter 5 and directive antenna 7. The transmitter or oscillating detector is connected to the audio frequency amplifier 17 and hence to the direct reading frequency meter 19.

The operation of the circuit of Fig. 4 is not unlike the operation of the circuits of Fig 3. In the instant case, the phase-frequency modulation is applied continuously to both the transmitted and reflected wave, and may therefore be preferably 90° instead of 180°. The oscillating detector combines the phase modulated reflected wave with the local oscillations, which are not phase modulated. As in the preceding circuit, the beat frequency signals are amplified and the altitude is indicated as a function of frequency.

Thus, the invention has been described as a phase-frequency modulation type of altimeter. The phase modulation may be applied to either the transmitted or reflected wave, or both, or the direct wave, so that the phase difference between the direct and reflected waves, at the detector, is shifted continuously through preferably 180°. If phase modulation is applied to both transmitted and local oscillations, either the modulation rates should be different, or the rates may be the same, if the phases are opposite. The phase-frequency modulation not only diminishes the errors of the frequency modulation type altimeters but also permits a narrow band width for corresponding accuracy. The phase-frequency type of altimeter provides accuracy near the earth and thereby improves the altimeter range which is most useful in the instrument landing of aircraft.

I claim as my invention:

1. A distance-measuring device including a source of frequency modulated waves, means for radiating said waves toward a reflecting surface, means for receiving said waves after reflection, means for shifting the phase of the waves from said source of waves with respect to said received reflected waves, and means for indicating the distance of said device from said surface as a function of the frequency of said phase frequency modulated waves.

2. A distance-measuring device including a source of frequency modulated radio waves, means for radiating said waves toward a wave reflecting object whose distance is to be measured, means for receiving said waves after reflection, means for varying the phase of said radiated waves, and means for indicating the distance of said object as a function of the frequency difference of said radiated and received waves.

3. A radio altimeter including a source of frequency modulated waves, means for radiating said waves toward a reflecting object, means for phase modulating said waves, means for receiving said waves after reflection, means for combining the waves from said source with the reflected waves to thereby form a beat frequency current, and means for indicating altitude as a function of the frequency of said current.

4. A radio altimeter including a source of modulation currents, a source of ultra high frequency currents, means for applying said modulation currents to frequency modulate said ultra high frequency currents, means for phase modulating said modulated ultra high frequency currents, means including the thus modulated currents for radiating said modulated waves toward a reflecting object, means for receiving said waves after reflection, means for beating said ultra high frequency waves and said received waves to form currents of a beat frequency, and means for indicating altitude as a function of said beat frequency.

5. A radio altimeter including a source of ultra high frequency waves, means for frequency modulating said waves, means for phase modulating said frequency modulated waves, means for radiating said last mentioned modulated waves, a receiver for receiving said waves after reflection, a detector for combining said reflected waves and the waves from said source to form beat frequency currents, and means for indicating the frequency of said beat frequency currents.

6. A radio altimeter including a source of ultra high frequency waves, a frequency modulator for said waves, a phase modulator for said waves, means for effectively connecting said source, said frequency modulator and said phase to obtain phase and frequency modulated waves, means for radiating said phase and frequency modulated waves toward the earth, means for receiving said waves after reflection, means connected to said receiving means for beating the received waves and said frequency modulated wave to derive a current of a frequency dependent upon said altitude, and a direct reading frequency meter connected to said receiving means for indicating said altitude as a function of frequency.

7. A radio altimeter including a source of frequency modulated waves, means for radiating said waves toward a reflecting object, means for receiving said waves after reflection, means for phase modulating the waves of said source, means for combining said phase modulated waves and said reflected waves to form a beat frequency current and means for indicating altitude as a function of said beat frequency.

8. In a device of the character of claim 3, means for neutralizing the effect of the directly received radiated waves upon said receiving means.

9. In a device of the character of claim 7, means for neutralizing the effect of the directly received radiated waves upon said receiving means.

10. The method of indicating distance, including generating radio frequency waves, frequency modulating said waves, radiating said waves toward a reflecting surface, receiving said waves after reflecting, phase modulating said waves, combining said generated and said received waves, and indicating the distance of said reflecting surface from said device as a function of the frequency of said waves.

11. The method of indicating distance, including generating radio frequency waves, varying the frequency of said waves, directing said waves toward an object whose distance is to be measured, receiving said waves after reflection from said object, combining said generated and receiving waves to obtain a beat frequency current, varying the phase of said generated waves with respect to said received waves, and indicating the distance of said object as a function of said beat frequency current.

12. The method of indicating distance, which includes radiating frequency modulated waves toward a reflecting surface, receiving said waves after reflection, phase modulating said frequency modulated waves, combining said reflected waves and said phase modulating waves to form a beat frequency current, and indicating the frequency of said beats to thereby indicate distance.

13. The method of indicating distance, which includes radiating frequency modulated waves toward a reflecting object, phase modulating said frequency modulated waves, receiving said frequency modulated waves after reflection from said object, neutralizing the effect of the directly received radiated waves, combining said received reflected waves and said phase modulated waves to form currents of beat frequency, and indicating distance as a function of said beat frequency.

14. The method of indicating distance, which includes generating radio frequency waves, frequency modulating said waves, phase modulating said waves, radiating said phase and frequency modulated waves toward a wave reflecting object, receiving said reflected waves, combining said received waves and said frequency modulated waves to form currents of beat frequency, and indicating distance as a function of said frequency.

ROYDEN C. SANDERS, Jr.